United States Patent
Gallagher et al.

(10) Patent No.: US 8,315,463 B2
(45) Date of Patent: Nov. 20, 2012

(54) USER INTERFACE FOR FACE RECOGNITION

(75) Inventors: Andrew C. Gallagher, Pittsburgh, PA (US); Alexander C. Loui, Penfield, NY (US); Cathleen D. Cerosaletti, Rochester, NY (US); Stacie L. Hibino, San Jose, CA (US); Madirakshi Das, Rochester, NC (US); Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1518 days.

(21) Appl. No.: 11/559,544

(22) Filed: Nov. 14, 2006

(65) Prior Publication Data

US 2008/0112621 A1 May 15, 2008

(51) Int. Cl.
*G06K 9/46* (2006.01)
*G06K 9/00* (2006.01)

(52) U.S. Cl. ....................................... 382/190
(58) Field of Classification Search .................. 382/103, 382/115–118, 164, 165, 173, 190, 199, 203, 382/224, 275, 278, 284, 294, 305; 345/600–604, 345/629
See application file for complete search history.

(56) References Cited

U.S. PATENT DOCUMENTS

| 5,164,831 A | 11/1992 | Kuchta et al. | |
| 5,802,208 A * | 9/1998 | Podilchuk et al. | 382/224 |
| 6,038,333 A * | 3/2000 | Wang | 382/118 |
| 6,184,926 B1 * | 2/2001 | Khosravi et al. | 348/239 |
| 6,792,135 B1 * | 9/2004 | Toyama | 382/118 |
| 7,027,619 B2 * | 4/2006 | Pavlidis et al. | 382/115 |
| 7,187,786 B2 * | 3/2007 | Kee | 382/118 |
| 7,221,780 B1 * | 5/2007 | Wang | 382/118 |
| 7,379,568 B2 * | 5/2008 | Movellan et al. | 382/118 |
| 7,460,707 B2 * | 12/2008 | Nishi | 382/167 |
| 7,596,247 B2 * | 9/2009 | Ioffe | 382/118 |
| 2002/0039447 A1 | 4/2002 | Shniberg et al. | |
| 2003/0210808 A1 | 11/2003 | Chen et al. | |
| 2004/0264780 A1 | 12/2004 | Zhang et al. | |
| 2004/0264810 A1 | 12/2004 | Taugher et al. | |
| 2005/0013507 A1 * | 1/2005 | Lee et al. | 382/284 |
| 2005/0117173 A1 * | 6/2005 | Kugo | 358/1.1 |
| 2006/0161588 A1 | 7/2006 | Nomoto | |
| 2006/0239515 A1 | 10/2006 | Zhang et al. | |
| 2006/0280341 A1 * | 12/2006 | Koshizen et al. | 382/118 |
| 2008/0112621 A1 * | 5/2008 | Gallagher et al. | 382/190 |

FOREIGN PATENT DOCUMENTS

| JP | 2006-079457 | 3/2006 |
| WO | 2006/080755 | 8/2006 |

OTHER PUBLICATIONS

Jcnes et al, Fast Multi-view Face Detection, IEEE Conf. on Computer Vision and Pattern Recognition (CVPR), Jun. 2003.
Cootes et al, Constrained Active Appearance Models, 8th International Conf. on Computer Vision, vol. 1, pp. 748-754, IEEE Computer Society Press, Jul. 2001.

* cited by examiner

*Primary Examiner* — Amir Alavi
(74) *Attorney, Agent, or Firm* — Raymond L. Owens

(57) ABSTRACT

A method of organizing an image collection includes detecting faces in the image collection, extracting features from the detected faces, determining a set of unique faces by analyzing the extracted features, wherein each face in the set of unique faces is believed to be from a different person than the other faces in the set; and displaying the unique faces to a user.

6 Claims, 8 Drawing Sheets

USER INTERFACE FOR FACE RECOGNITION

FIELD OF INVENTION

The field of the invention relates to managing, labeling and searching a collection of digital images and videos.

BACKGROUND OF THE INVENTION

With the advent of digital photography, consumers are amassing large collections of digital images and videos. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases.

A user desires to find images and videos containing a particular person of interest. The user can perform a manual search to find images and videos containing the person of interest. However this is a slow, laborious process. Even though some commercial software (e.g. Adobe Photoshop Album by Adobe Systems Inc.) allows users to tag images with labels indicating the people in the images so that searches can later be done, the initial labeling process is still very tedious and time consuming.

Face recognition software assumes the existence of a ground-truth labeled set of images (i.e. a set of images with corresponding person identities). Most consumer image collections do not have a similar set of ground truth. In addition, face recognition generally requires a training stage where a user would need to label many images from her collection. This labeling stage is tedious and time-consuming. Many users would desire some ability to search through their image collections based on the identities of the people in the images, with little or no work on their part to prepare their image collection.

There exist many image processing packages that attempt to recognize people for security or other purposes. Some examples are the FaceVACS face recognition software from Cognitec Systems GmbH and the Facial Recognition SDKs from Imagis Technologies Inc. and Identix Inc. These packages are primarily intended for security-type applications where the person faces the camera under uniform illumination, frontal pose and neutral expression. These methods are not suited for use with personal consumer image collections due to the unfriendly workflow.

SUMMARY OF THE INVENTION

It is an object of the present invention to search a collection of images and identify unique object or faces in the collections.

This object is achieved by a method of organizing an image collection including detecting faces in the image collection, extracting features from the detected faces, determining a set of unique faces by analyzing the extracted features, wherein each face in the set of unique faces is believed to be from a different person than the other faces in the set, and displaying the unique faces to a user.

BRIEF DESCRIPTION OF THE DRAWINGS

The subject matter of the invention is described with reference to the embodiments shown in the drawings.

DETAILED DESCRIPTION OF THE INVENTION

In the following description, some embodiments of the present invention will be described as software programs. Those skilled in the art will readily recognize that the equivalent of such a method can also be constructed as hardware or software within the scope of the invention.

Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
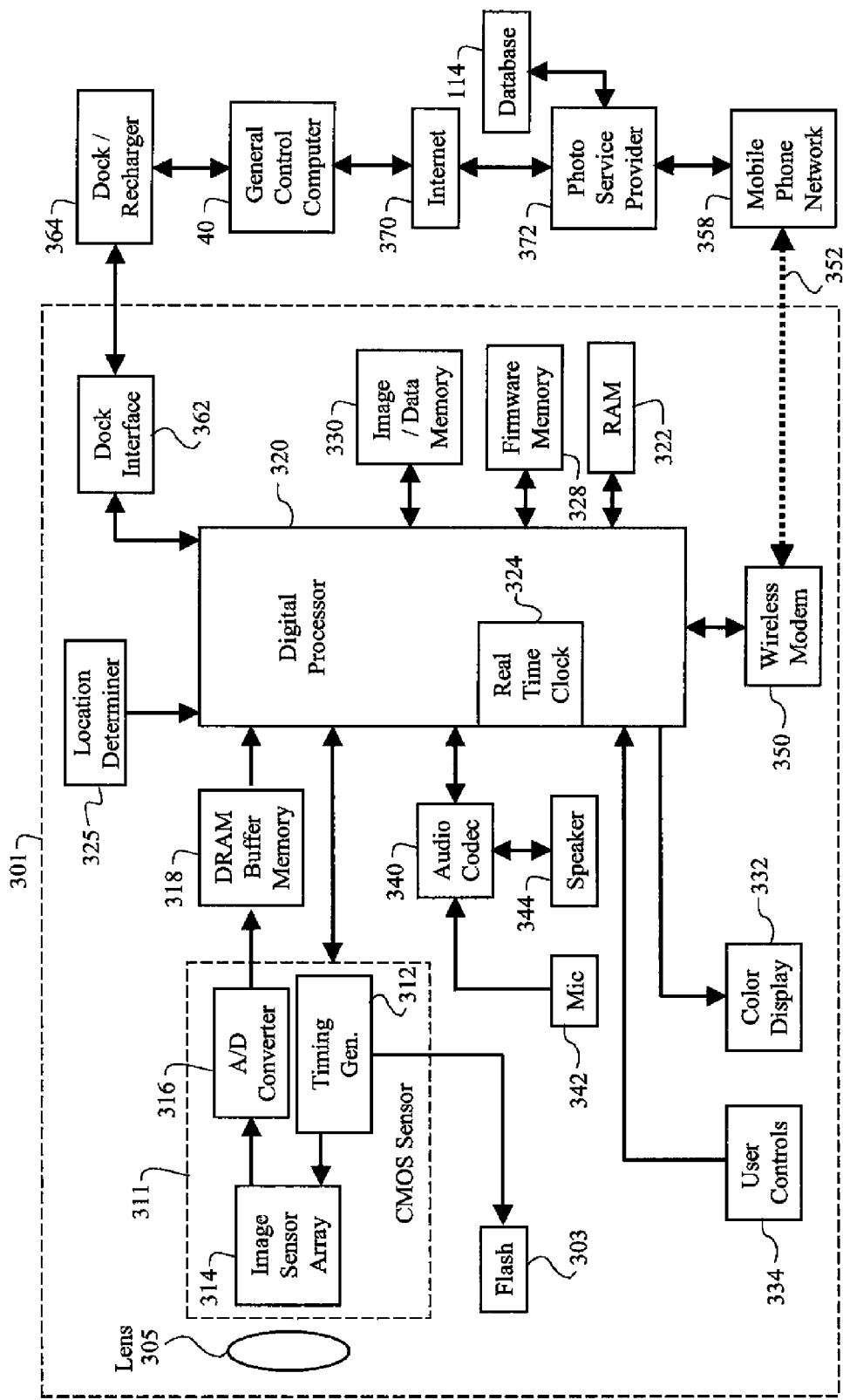
FIG. 1 is a block diagram of a camera phone based imaging system that can implement the present invention.

FIG. 1 is a block diagram of a digital camera phone 301 based imaging system that can implement the present invention. The digital camera phone 301 is one type of digital camera. Preferably, the digital camera phone 301 is a portable battery operated device, small enough to be easily handheld by a user when capturing and reviewing images. The digital camera phone 301 produces digital images that are stored using the image data/memory 330, which can be, for example, internal Flash EPROM memory, or a removable memory card. Other types of digital image storage media, such as magnetic hard drives, magnetic tape, or optical disks, can alternatively be used to provide the image/data memory 330.

The digital camera phone 301 includes a lens 305 that focuses light from a scene (not shown) onto an image sensor array 314 of a complementary metal oxide semiconductor (CMOS) image sensor 311. The image sensor array 314 can provide color image information using the well-known Bayer color filter pattern. The image sensor array 314 is controlled by timing generator 312, which also controls a flash 303 in order to illuminate the scene when the ambient illumination is low. The image sensor array 314 can have, for example, 1280 columns×960 rows of pixels.

In some embodiments, the digital camera phone 301 can also store video clips, by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example using a 24 frame per second readout rate.

The analog output signals from the image sensor array 314 are amplified and converted to digital data by an analog-to-digital (A/D) converter circuit 316 on the CMOS image sensor 311. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the digital camera phone 301 and digital processor 320 are in their low power state.

The processed digital image files are stored in the image/data memory 330. The image/data memory 330 can also be used to store the user's personal information, such as address book, contact information, calendar, and the like. The image/data memory can also store other types of data, such as phone numbers, to-do lists, and the like.

In the still image mode, the digital processor 320 performs color interpolation followed by color and tone correction, in order to produce rendered sRGB image data. The digital processor 320 can also provide various image sizes selected by the user. The rendered sRGB image data is then JPEG compressed and stored as a JPEG image file in the image/data memory 330. The JPEG file uses the so-called "Exif" image format described earlier. This format includes an Exif application segment that stores particular image metadata using various TIFF tags. Separate TIFF tags can be used, for example, to store the date and time the picture was captured, the lens f/number and other camera settings, and to store image captions. In particular, the ImageDescription tag can be used to store labels. The real-time clock 324 provides a capture date/time value, which is stored as date/time metadata in each Exif image file.

A location determiner 325 provides the geographic location associated with an image capture. The location is preferably stored in units of latitude and longitude. Note that the location determiner 325 can determine the geographic location at a time slightly different than the image capture time. In that case, the location determiner 325 can use a geographic location from the nearest time as the geographic location associated with the image. Alternatively, the location determiner 325 can interpolate between multiple geographic positions at times before and/or after the image capture time to determine the geographic location associated with the image capture. Interpolation can be necessitated because it is not always possible for the location determiner 325 to determine a geographic location. For example, the GPS receivers often fail to detect signal when indoors. In that case, the last successful geographic location (i.e. prior to entering the building) can be used by the location determiner 325 to estimate the geographic location associated with a particular image capture. The location determiner 325 can use any of a number of methods for determining the location of the image. For example, the geographic location can be determined by receiving communications from the well-known Global Positioning Satellites (GPS).

The digital processor 320 also creates a low-resolution "thumbnail" size image, which can be created as described in commonly-assigned U.S. Pat. No. 5,164,831 to Kuchta, et al., the disclosure of which is herein incorporated by reference. The thumbnail image can be stored in RAM memory 322 and supplied to a color display 332, which can be, for example, an active matrix LCD or organic light emitting diode (OLED). After images are captured, they can be quickly reviewed on the color LCD image display 332 by using the thumbnail image data.

The graphical user interface displayed on the color display 332 is controlled by user controls 334. The user controls 334 can include dedicated push buttons (e.g. a telephone keypad) to dial a phone number, a control to set the mode (e.g. "phone" mode, "camera" mode), a joystick controller that includes 4-way control (up, down, left, right) and a push-button center "OK" switch, or the like.

An audio encoder decoder (codec) 340 connected to the digital processor 320 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from a mobile phone network 358 and stored in the image/data memory 330. In addition, a vibration device (not shown) can be used to provide a silent (e.g. non audible) notification of an incoming phone call.

A dock interface 362 can be used to connect the digital camera phone 301 to a dock/charger 364, which is connected to a general control computer 40. The dock interface 362 can conform to, for example, the well-known USB interface specification. Alternatively, the interface between the digital camera 301 and the general control computer 40 can be a wireless interface, such as the well-known Bluetooth wireless interface or the well-known 802.11b wireless interface. The dock interface 362 can be used to download images from the image/data memory 330 to the general control computer 40. The dock interface 362 can also be used to transfer calendar information from the general control computer 40 to the image/data memory in the digital camera phone 301. The dock/charger 364 can also be used to recharge the batteries (not shown) in the digital camera phone 301.

The digital processor 320 is coupled to a wireless modem 350, which enables the digital camera phone 301 to transmit and receive information via an RF channel 352. A wireless modem 350 communicates over a radio frequency (e.g. wireless) link with the mobile phone network 358, such as a 3GSM network. The mobile phone network 358 communicates with a photo service provider 372, which can store digital images uploaded from the digital camera phone 301. These images can be accessed via the Internet 370 by other devices, including the general control computer 40. The mobile phone network 358 also connects to a standard telephone network (not shown) in order to provide normal telephone service.

Figure 2:
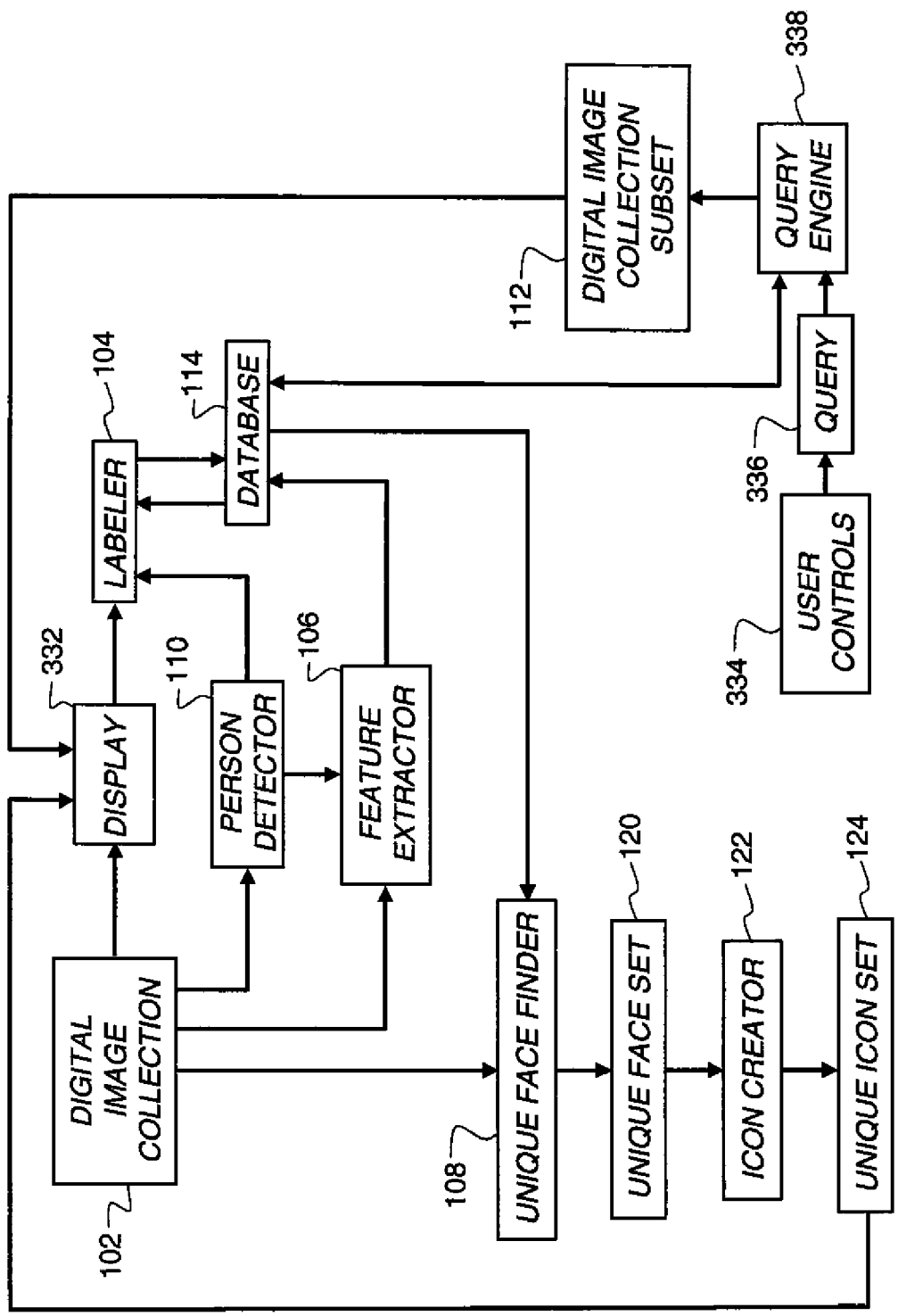
FIG. 2 is a flow chart of an embodiment of the present invention for searching and labeling images in a digital image collection that uses the system of FIG. 1.

An embodiment of the invention is illustrated in FIG. 2. The present invention aids in organizing a set of images and videos that contain people by automatically extracting a set of unique faces from the images. Then, an icon representing each face is displayed on the display. This icon is used to simplify the process of labeling images and videos containing a particular person and querying for images and videos containing a particular person of interest. FIG. 2 is embodied in the structure of FIG. 1 and many of the functions are provided by the digital processor 320. The invention is applicable in many different environments than the one described in FIG. 1 and can be used on a digital camera or a computer or other electronic device.

A digital image collection 102 and a digital image collection subset 112 include both images and videos. For convenience, the term "image" refers to both single frame images and videos. Videos are a collection of images with accompanying audio and sometimes text. The digital image collection subset 112 is the set of images from the digital image collection 102 believed to contain the person or persons of interest, as indicated by the user using the user controls 334 to initiate a query 336. The query engine 338 find, by using information stored in a database 114, images from the digital image collection 102 that satisfy the query 336 to produce the digital image collection subset 112. The digital image collection subset 112 is displayed on the display 332 for review by the human user.

The digital image collection 102 containing people is examined by a person detector 110 to identify people in the images and videos. The person detector 110 can be a manual operation where a user inputs the position of people in images and videos by outlining the people, indicating eye position, or the like. Preferably, the person detector 110 implements a face detection algorithm. Methods for detecting human faces are well known in the art of digital image processing. For example, a face detection method for finding human faces in images is described in the following article: Jones, M. J.; Viola, P., "Fast Multi-view Face Detection", *IEEE Conference on Computer Vision and Pattern Recognition (CVPR)*, June 2003. A feature extractor 106 extracts features associated with each detected person and stores the extracted features in the database 114.

Figure 3:
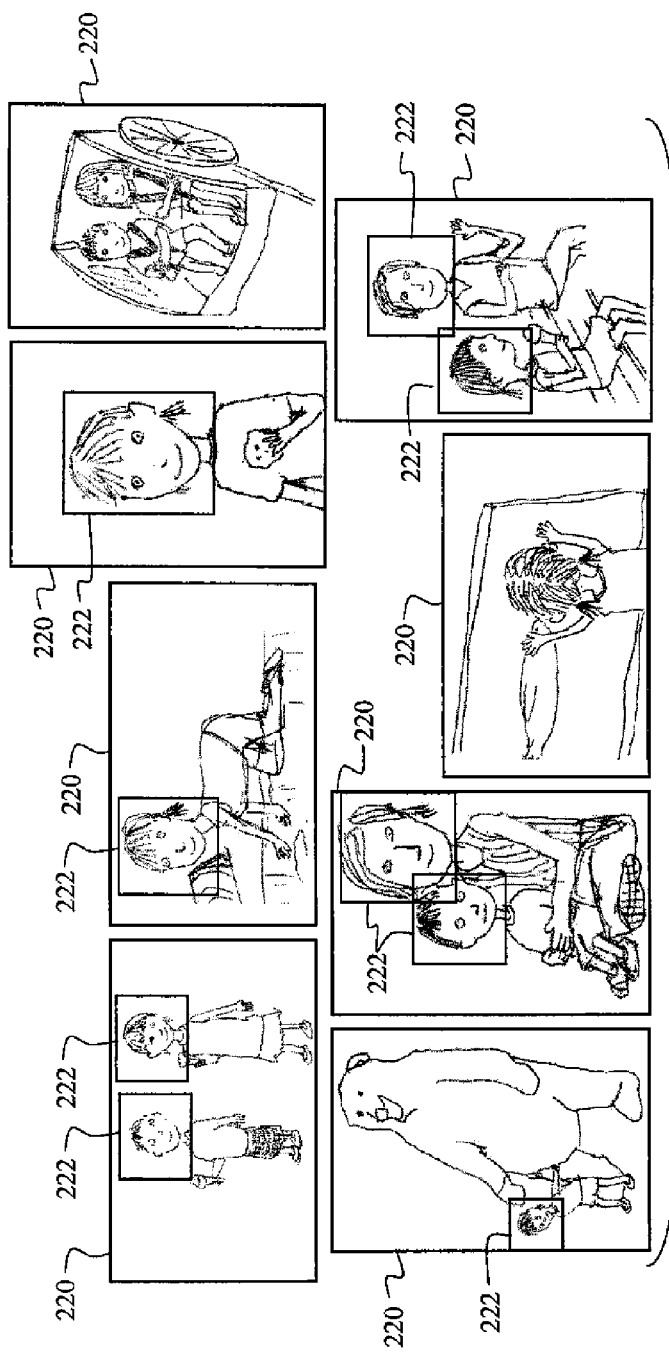
FIG. 3 shows a representative set of images in a collection with faces detected.

A unique face finder 108 examines the set of features from detected people and finds a set of unique faces 120. Ideally, the set of unique faces contains exactly one instance of each individual that appears in the digital image collection 102. Each face in the set of unique faces 120 is believed to be from a different person than the other faces in the set. The set of unique faces 120 can also be one instance of each individual that appears in the digital image collection 102 more than X times, or in at least Y % of the images and videos. For example, the unique face finder 108 can implement an algorithm that is similar to the face clustering process described in U.S. Patent Application Publication No. 2003/0210808 by Chen and Das. First, a set of features associated with a face is selected at random from the database 114 and called a unique individual. Second, another feature set is fetched and compared to all previously declared individuals, producing a dissimilarity score. The comparison is done by a face recognition program such as the Visionics FaceIt Software Developer's Kit (SDK), or simply by computing the Euclidean distance between the pair of feature vectors. The dissimilarity score(s) are compared to a predetermined threshold, and if the score is large enough (i.e. if the newly fetched feature set is different enough from the feature sets associated with all previously declared individuals, the newly fetched feature set is called a unique individual. Otherwise, the unassigned face is added to the cluster containing the face with the highest similarity score. The above steps (from the second step on) are repeated until all feature sets have been examined. For example, FIG. 3 shows a set of images 220 from the digital image collection 102. Detected faces are indicated with boxes 222.

Figure 4:
FIG. 4 shows a representative unique icon set derived from the collections of FIG. 3.

The resulting unique face set 120 is input to an icon creator 122 which creates an icon from each face in the unique face set 120. This is accomplished by cropping and resizing the area corresponding to the face from the original image or videos from the digital image collection 102. For example, FIG. 4 shows a unique icon set 124 containing the icons 224 associated with the unique people from the image collection 102 shown in FIG. 3.

Figure 5:
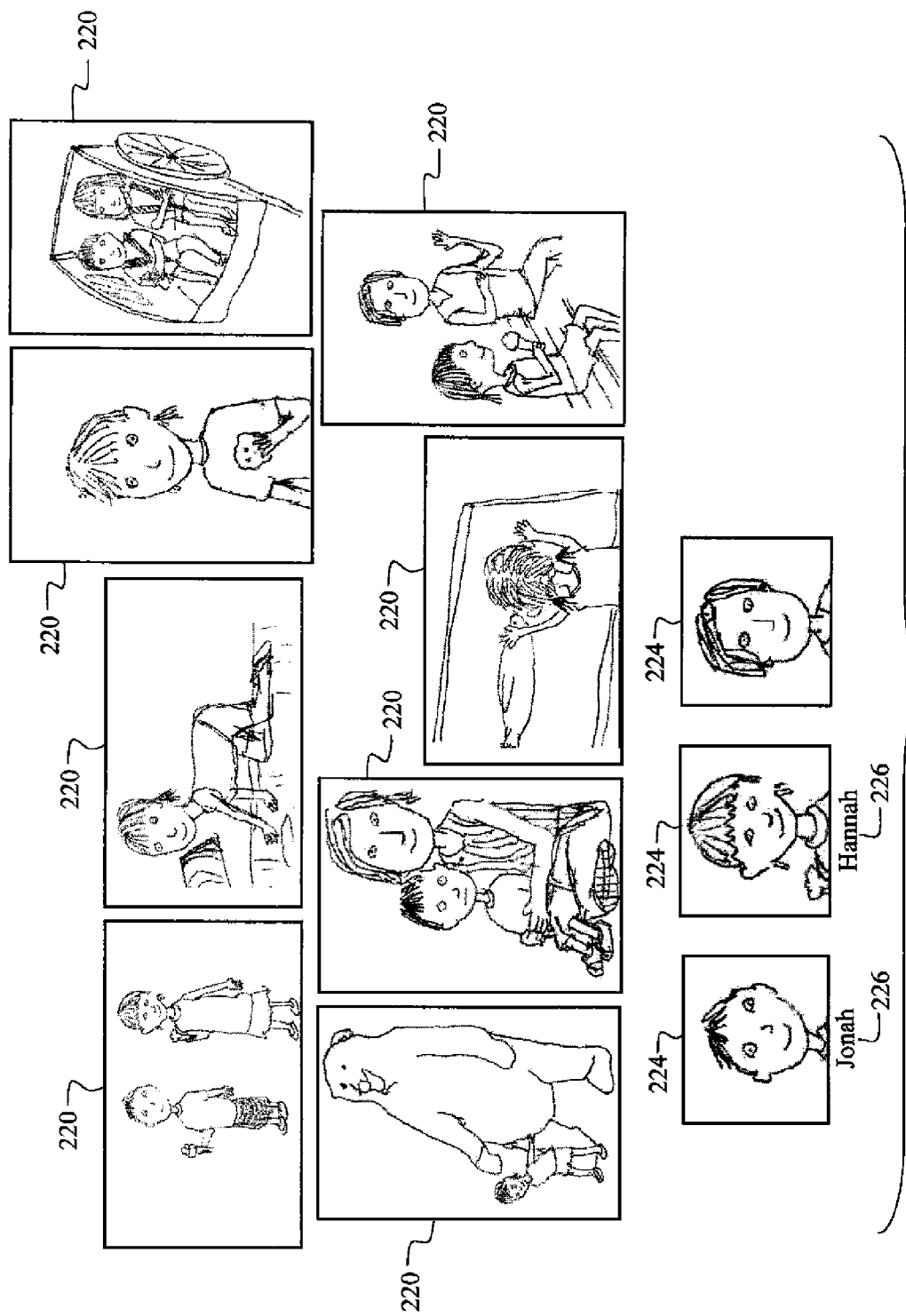
FIG. 5 shows a collection of images and unique icons that are labeled.

This unique icon set 124 is used to create a powerful set of user controls for organizing, labeling and querying an image collection 102. As shown in FIG. 5, the digital image collection 102 is displayed adjacent to icons 224 of the unique face set 120. Using the user controls 334, the user can provide a label 226 for any or all of the icons 224 of the unique face set 120. In addition, the user easily labels other images in the digital image collection 102 by, for example, dragging and dropping a set of images that contain a particular individual shown by a particular icon 224 onto that icon 224 using a typical user control 334 such as a touch screen, a mouse, audio input, text input, or keyboard input. Those skilled in the arts will appreciate that other user control arrangements can also be used such as a gesture-based system. Then a labeler 104 from FIG. 2 records that association in the database 114. Alternatively, an icon 224 can be dropped onto an image or video of the digital image collection 102 to indicate that the individual represented by the icon is located in the target image or video. Additionally, when more than one person is present in the target image, the precise location within the target image indicates the position of the individual associated with the icon 224.

A label from the labeler 104 indicates that a particular image or video contains a person of interest. The label typically can be a name and includes at least one of the following:

(1) the name of a person of interest in an image or video. A person's name can be a given name that includes a nickname, or an identifier of a particular relationship or person (e.g., Mom).

(2) an identifier associated with the person of interest such as a text string or identifier such as "Person A" or "Person B".

(3) the location of the person of interest within the image or video.

Note that the terms "tag", "caption", and "annotation" are used synonymously with the term "label."

A search for a person of interest is initiated by a user as follows: The user indicates a query 336 for an image of one or more persons of interest by clicking on (or touching or otherwise indicating through the user controls 334) the corresponding one or more icons 224. The query engine 338 then searches the database 114 for images containing detected persons that have labels indicating they are persons of interest, or for images containing people with corresponding features that are similar to the features associated with the features of the indicated iconic faces.

Figure 6:
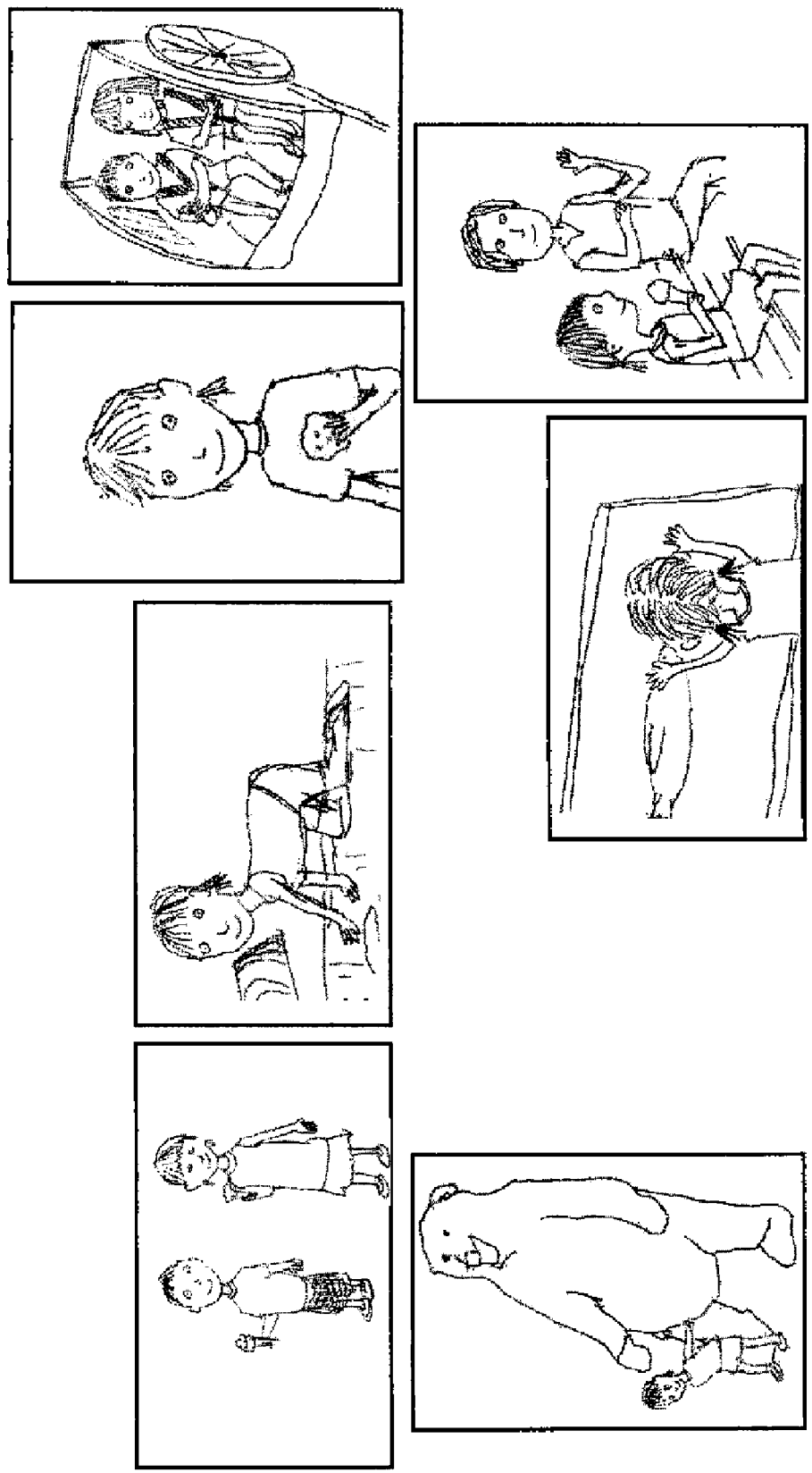
FIG. 6 shows a subset of images found with a user-initiated query (icons or labels) of the digital image collection.

For example, referring again to FIG. 5. suppose the user initiates a query for images of Hannah and Jonah, by clicking on the first and second of the three icons 224. The query engine 338 finds images that contain people labeled as Hannah and Jonah, or images that contain persons with features similar to the features associated with the features of the icons of Hannah and Jonah. One of the icons is not labeled. Comparing feature vectors is a fundamental task of pattern recognition and will not be further discussed. The resulting digital image collection subset 112, shown in FIG. 6, is then shown to the user on the display 332. The user can then easily label the images of the digital image collection subset 112, in effect correcting the mistakes of the query engine 338. In addition to the previously described methods for labeling images, at the conclusion of the search when the digital image collection subset 112 is shown on the display 332, the message "Label these images?" appears on the display, and the user can confirm that the images of the digital image collection subset 112 do contain the persons of interest (Hannah and Jonah) by selecting "yes", and at that time, the database 114 is updated to associate the labels Hannah and Jonah with the images of the digital image collection subset 112. Or, the user can select "no" and choose to leave the labels for the images of the digital image collection subset 112 unmodified.

Figure 7:
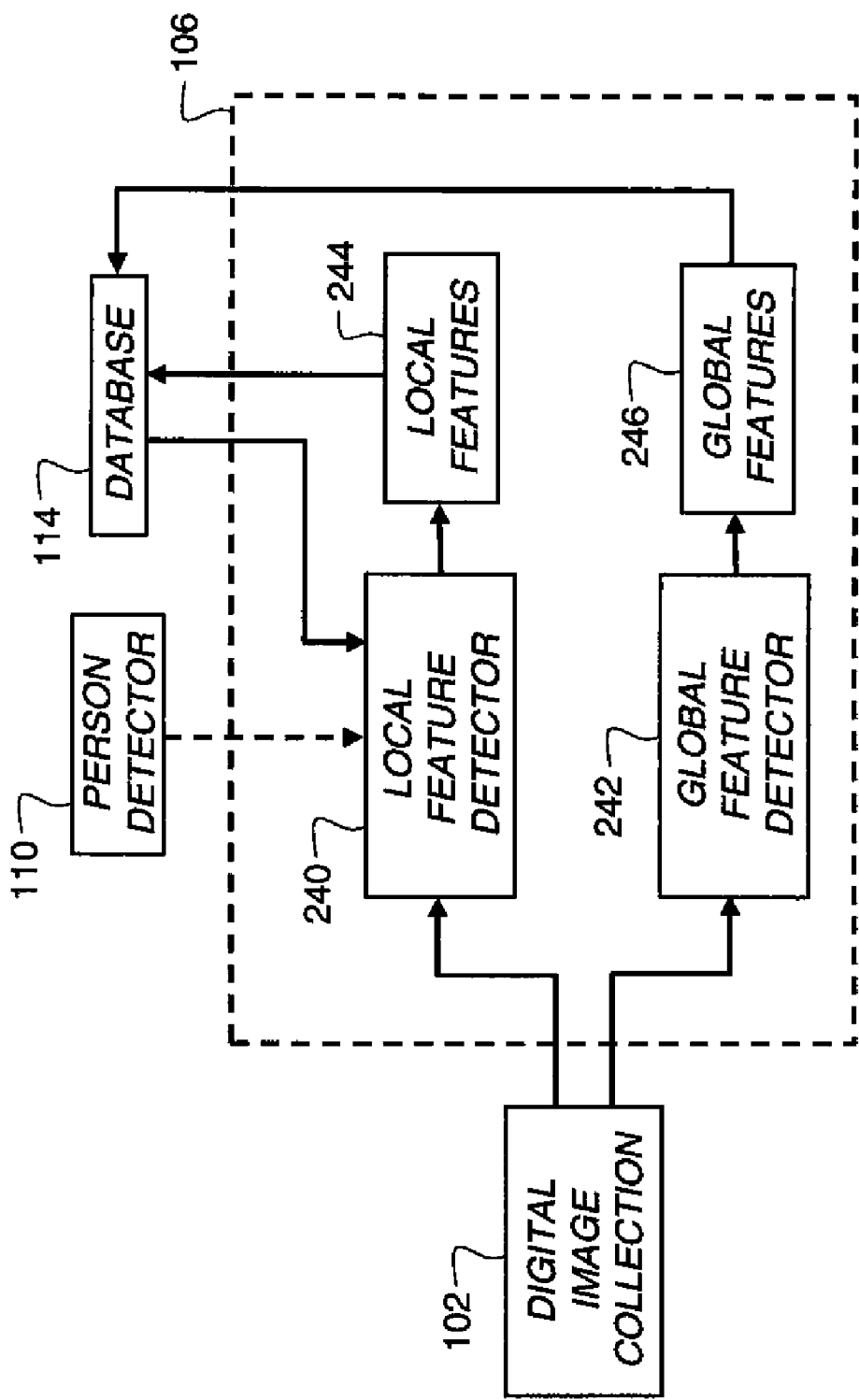
FIG. 7 is a flow chart of the feature extractor 106 of FIG. 2.

FIG. 7 describes the feature extractor 106 from FIG. 2 in greater detail. The feature extractor 106 determines features related to people from images and videos in the digital image collection 102. These features are then used by the person finder 108 to find images or videos in the digital image collection 102 believed to contain the person of interest. The feature extractor 106 determines two types of features related to people. A global feature detector 242 determines global features 246. The global feature 246 is a feature that is independent of the identity or position of the individual in an image of video. For example, the identity of the photographer is a global feature because the photographer's identity is constant no matter how many people are in an image or video and is likewise independent of the position and identities of the people.

Additional global features 246 include:

Image/video file name.

Image/video capture time. Image capture time can be a precise minute in time, e.g. Mar. 27, 2004 at 10:17 AM. Or the image capture time can be less precise, e.g. 2004 or March 2004. The image capture time can be in the form of a probability distribution function e.g. Mar. 27, 2004 +/−2 days with 95% confidence. Often times the capture time is embedded in the file header of the digital image or video. For example, the EXIF image format (described at www.exif.org) allows the image or video capture device to store information associated with the image or video in the file header. The "Date\Time" entry is associated with the date and time the image was captured. In some cases, the digital image or video results from scanning film and the image capture time is determined by detection of the date printed into the image (as is often done at capture time) area, usually in the lower left corner of the image. The date a photograph is printed is often printed on the back of the print. Alternatively, some film systems contain a magnetic layer in the film for storing information such as the capture date.

Capture condition metadata (e.g. flash fire information, shutter speed, aperture, ISO, scene brightness, etc.)

Geographic location. The location is preferably stored in units of latitude and longitude.

Scene environment information. Scene environment information is information derived from the pixel values of an image or video in regions not containing a person. For example, the mean value of the non-people regions in an image or video is an example of scene environment information. Another example of scene environment information is texture samples (e.g. a sampling of pixel values from a region of wallpaper in an image).

Geographic location and scene environment information are important clues to the identity of persons in the associated images. For example, a photographer's visit to grandmother's house could be the only location where grandmother is photographed. When two images are captured with similar geographic locations and environments, it is more likely that detected persons in the two images are the same as well.

Scene environment information can be used by the person detector 110 to register two images. This is useful when the photographed people are mostly stationary, but the camera moves slightly between consecutive photographs. The scene environment information is used to register the two images, thereby aligning the positions of the people in the two frames. This alignment is used by the person finder 108 because when two persons have the same position in two images captured closely in time and registered, then the likelihood that the two people are the same individual is high.

A local feature detector 240 computes local features 244. Local features are features directly relating to the appearance of a person in an image or video. Computation of these features for a person in an image or video requires knowledge of the position of the person. The local feature detector 240 is passed information related to the position of a person in an image of video from either the person detector 110, or the database 114, or both.

Once the position of a person is known, the local feature detector 240 can detect local features 244 associated with the person. Once a face position is known, the facial features (e.g. eyes, nose, mouth, etc.) can also be localized using well known methods such as described by Yuille et al. in, "Feature Extraction from Faces Using Deformable Templates," Int. Journal of Comp. Vis., Vol. 8, Iss. 2, 1992, pp. 99-111. The authors describe a method of using energy minimization with template matching for locating the mouth, eye and iris/sclera boundary. Facial features can also be found using active appearance models as described by T. F. Cootes and C. J. Taylor "Constrained active appearance models", 8th International Conference on Computer Vision, volume 1, pages 748-754. IEEE Computer Society Press, July 2001. In the preferred embodiment, the method of locating facial feature points based on an active shape model of human faces described in "An automatic facial feature finding system for portrait images", by Bolin and Chen in the Proceedings of IS&T PICS conference, 2002 is used.

Figure 8:
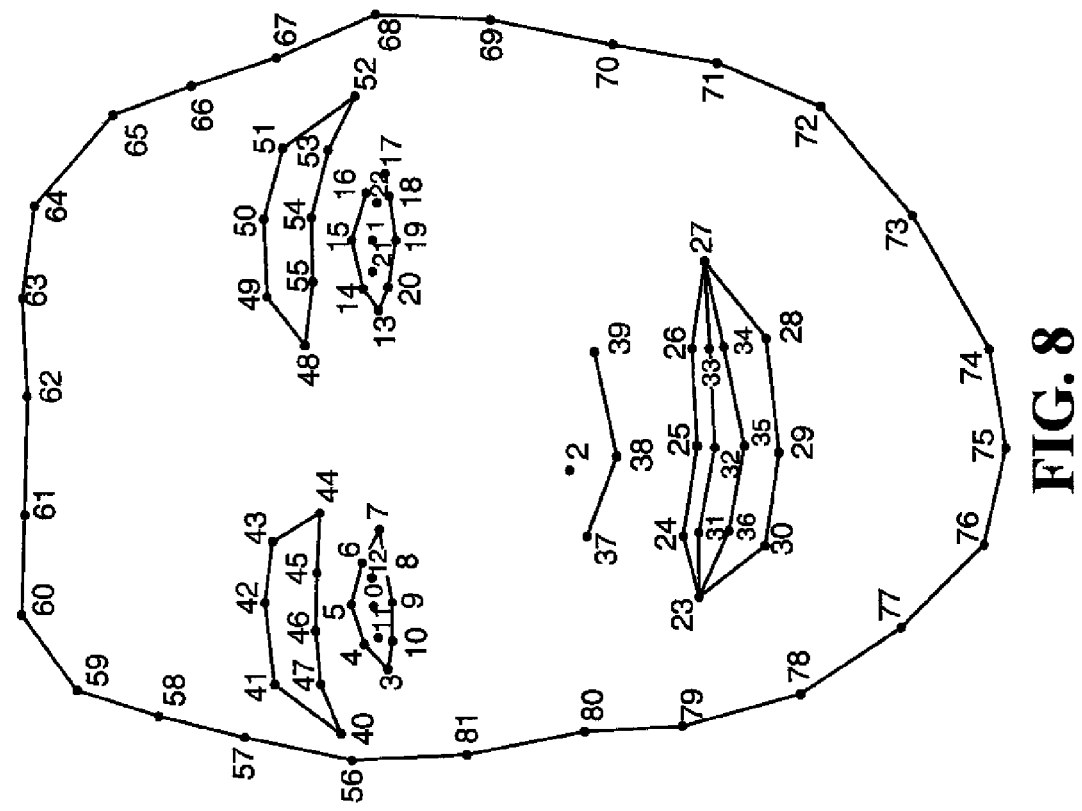
FIG. 8 shows a visual representation of features that describe geometric properties of a face.

The local features 244 are quantitative descriptions of a person. Preferably, the person finder feature extractor 106 outputs one set of local features 244 and one set of global features 246 for each detected person. Preferably the local features 244 are based on the locations of 82 feature points associated with specific facial features, found using a method similar to the aforementioned active appearance model of Cootes et al. A visual representation of the local feature points for an image of a face is shown in FIG. 8 as an illustration. The local features can also be distances between specific feature points or angles formed by lines connecting sets of specific feature points, or coefficients of projecting the feature points onto principal components that describe the variability in facial appearance.

Again referring to FIG. 7, the global features 246 and local features 244 are stored in the database 114. Global features associated with all people in an image are represented by $F_G$. The N sets of local features associated with the N people in an image are represented as $F_{L0}, F_{L1}, \ldots, F_{LN-1}$. The complete set of features for a person n in the image is represented as $F_n$ and includes the global features $F_G$ and the local features $F_{Ln}$. The M labels associated with the image are represented as $L_0$, $L_1, \ldots, L_{M-1}$. When the label does not include the position of the person, there is ambiguity in knowing which label is associated with which set of features representing persons in the image or video. For example, when there are two sets of features describing two people in an image and two labels, it is not obvious which features belongs with which label. The person finder 108 solves this constrained classification problem of matching labels with sets of local features, where the labels and the local features are associated with a single image. There can be any number of labels and local features, and even a different number of each.

Here is an example entry of labels and features associated with an image in the database 114:

Image 101_346.JPG
Label $L_0$: Hannah
Label $L_1$: Jonah
Features $F_0$:
    Global Features $F_G$:
        Capture Time: Aug. 7, 2005, 6:41 PM EST.
        Flash Fire: No -continued

```
         Shutter Speed: 1/724 sec.
         Camera Model: Kodak C360 Zoom Digital Camera
         Aperture: F/2.7
         Environment:
     Local Features $F_{L0}$:
         Position: Left Eye: [1400 198] Right Eye: [ 1548 202]
         $C_0$ = [ −0.8, −0.01]';
         Glasses: none
     Associated Label: Unknown
 Features $F_1$:
     Global Features $F_G$:
         Capture Time: Aug. 7, 2005, 6:41 PM EST.
         Flash Fire: No
         Shutter Speed: 1/724 sec.
         Camera Model: Kodak C360 Zoom Digital Camera
         Aperture: F/2.7
         Environment:
     Local Features: $F_{L1}$:
         Position: Left Eye: [810 192] Right Eye: [ 956 190]
         $C_1$ = [ 0.06, 0.26]';
         Glasses: none
```

Associated Label: Unknown

Figure 9:
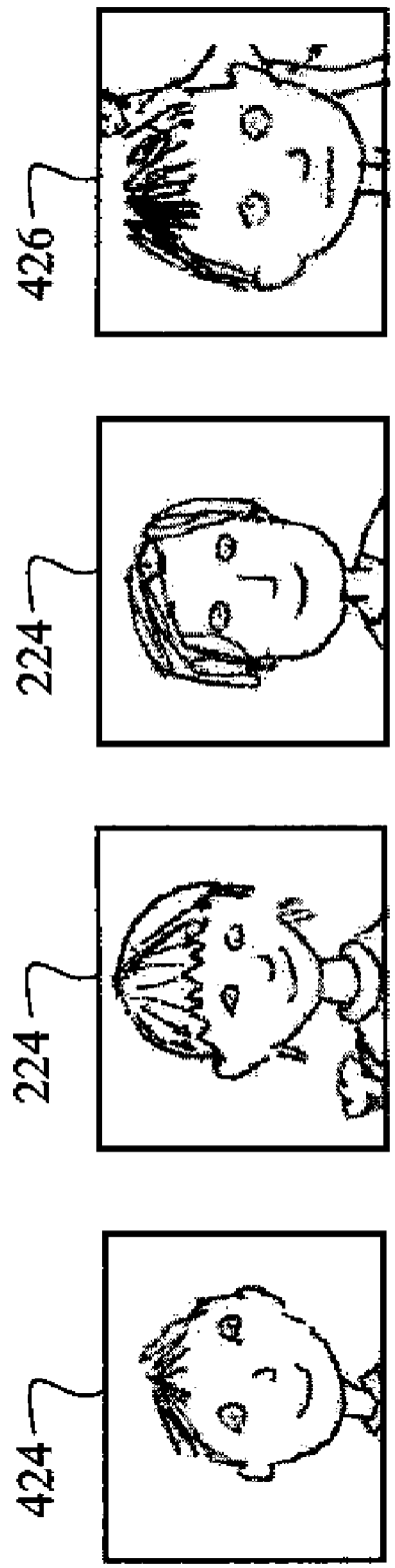
FIG. 9 shows icons of multiple faces wherein icons 424 and 426 are the same face.

In an additional embodiment of the present invention, FIG. 9 shows the unique icon set 124 determined from an analysis by the unique face finder 108. As with most real world problems, the algorithm does not have perfect performance, so icons 424 and 426 are actually two different instances of the same individual. The user can combine these two icons by, for example selecting (via the user controls 334) icon 424 and dropping it on icon 426. Icons 424 and 426 have been combined, and the display 332 would show only the three icons as shown in FIG. 5. The combining action also confirms to the labeler 104 that the two images from which the icons were created contain the same person. Therefore the query 336 for images containing the person represented by icon 424 would return both the images corresponding to the icon 424 was created and the image from which the icon 426 was created.

Furthermore, it can occur that an individual present in the digital image collection 102 is not represented in the unique face set 120. This mistake is remedied by the user finding that individual in the digital image collection 102, and then indicating the presence of that unique individual (by for example, drawing a box around the face). Then the icon creator 122 creates an icon associated with that individual and adds it to the unique icon set 124.

Those skilled in the art will recognize that many variations may be made to the description of the present invention without significantly deviating from the scope of the present invention.

PARTS LIST

| | |
|---|---|
| 40 | general control computer |
| 102 | digital image collection |
| 104 | labeler |
| 106 | feature extractor |
| 108 | unique face finder |
| 110 | person detector |
| 112 | digital image collection subset |
| 114 | database |
| 120 | unique face set |
| 122 | icon creator |
| 124 | unique icon set |
| 220 | image |
| 222 | detected face |
| 224 | icon |
| 226 | label |
| 240 | local feature detector |
| 242 | global feature detector |
| 244 | local features |
| 246 | global features |
| 301 | digital camera phone |
| 303 | flash |
| 305 | lens |
| 311 | CMOS image sensor |
| 312 | timing generator |
| 314 | image sensor array |
| 316 | A/D converter circuit |
| 318 | DRAM buffer memory |
| 320 | digital processor |
| 322 | RAM memory |
| 324 | real-time clock |
| 325 | location determiner |
| 328 | firmware memory |
| 330 | image/data memory |
| 332 | color display |
| 334 | user controls |
| 336 | query |
| 338 | query engine |
| 340 | audio codec |
| 342 | microphone |
| 344 | speaker |
| 350 | wireless modem |
| 358 | phone network |
| 362 | dock interface |
| 364 | dock/charger |
| 370 | Internet |
| 372 | service provider |
| 424 | icon |
| 426 | icon |

The invention claimed is:

1. A method of organizing an image collection comprising:
   a) detecting images in the image collection that contain one or more faces;
   b) using a feature extractor to extract local features relating to the appearance of a person from each detected face in the image collection and global features related to camera and capture conditions from each corresponding image, wherein global features include at least one of image capture time, geographic information, flash fire information, and camera model;
   c) determining a set of unique faces by analyzing the local and global extracted features, wherein each face in the set of unique faces is believed to be from a different person than the other faces in the set; and
   d) displaying the unique faces to a user.

2. The method of claim 1, further including:
   e) the user selecting one of the unique faces using a touch screen, a mouse, audio input, text input, or keyboard input.

3. The method of claim 2, wherein the user provides a label that is associated with the selected unique face.

4. The method of claim 3, wherein an image that contains a face similar to the selected unique face is annotated by a provided name.

5. The method of claim 2, further including selecting one or more unique faces and creating icon corresponding to such selected faces that are useable for future searching.

6. The method of claim 2 wherein there are two or more icons of the same face and such icons are combined into a single icon.

* * * * *